United States Patent [19]
Alberg

[11] Patent Number: 6,152,707
[45] Date of Patent: Nov. 28, 2000

[54] PORTABLE WATER TANK AND BOOSTER

[76] Inventor: Steven C. Alberg, 16200 Hwy. 10 NW., Elk River, Minn. 55330

[21] Appl. No.: 09/082,231

[22] Filed: May 20, 1998

Related U.S. Application Data

[60] Provisional application No. 60/047,837, May 28, 1997.

[51] Int. Cl.[7] .................................................. F04B 17/00
[52] U.S. Cl. ....................................... 417/423.3; 417/44.2
[58] Field of Search ................................ 417/423.3, 44.2

[56] References Cited

U.S. PATENT DOCUMENTS

| | | | |
|---|---|---|---|
| Re. 31,445 | 11/1983 | Carter | 222/333 |
| 2,230,830 | 2/1941 | Coberly . | |
| 2,931,382 | 4/1960 | Cirillo . | |
| 3,095,893 | 7/1963 | Martin . | |
| 3,133,501 | 5/1964 | Brady . | |
| 3,981,319 | 9/1976 | Holt | 137/211 |
| 4,072,168 | 2/1978 | Wittenmyer . | |
| 4,718,452 | 1/1988 | Maitland . | |
| 4,962,789 | 10/1990 | Benscoter . | |
| 5,046,529 | 9/1991 | Corella . | |
| 5,349,992 | 9/1994 | Gallo et al. . | |
| 5,624,237 | 4/1997 | Prescott et al. | 417/33 |
| 5,707,211 | 1/1998 | Kochan, Sr. | 417/38 |
| 5,765,995 | 6/1998 | Springer | 417/40 |
| 5,860,792 | 1/1999 | Marks | 417/366 |
| 5,901,744 | 5/1999 | Ricards | 137/568 |

FOREIGN PATENT DOCUMENTS

| | | | |
|---|---|---|---|
| 58-110882 | 7/1983 | Japan | 417/44.2 |

*Primary Examiner*—Henry Bennett
*Assistant Examiner*—Melvin Jones
*Attorney, Agent, or Firm*—Edwin E. Voigt, II, Esq.; Vidas, Arrett & Steinkraus

[57] ABSTRACT

A portable water storage tank having an internal submersible pump connected to a water discharge pipe and an internal air-hydropneumatic tank also connected to the water discharge pipe; a pressure switch connected to the discharge pipe and an electrical circuit for turning the pump on and off in response to pressure variations in the water discharge pipe. A water heater in the water storage tank and a temperature sensor in the tank to activate the heater upon detection of predetermined water temperatures.

9 Claims, 4 Drawing Sheets

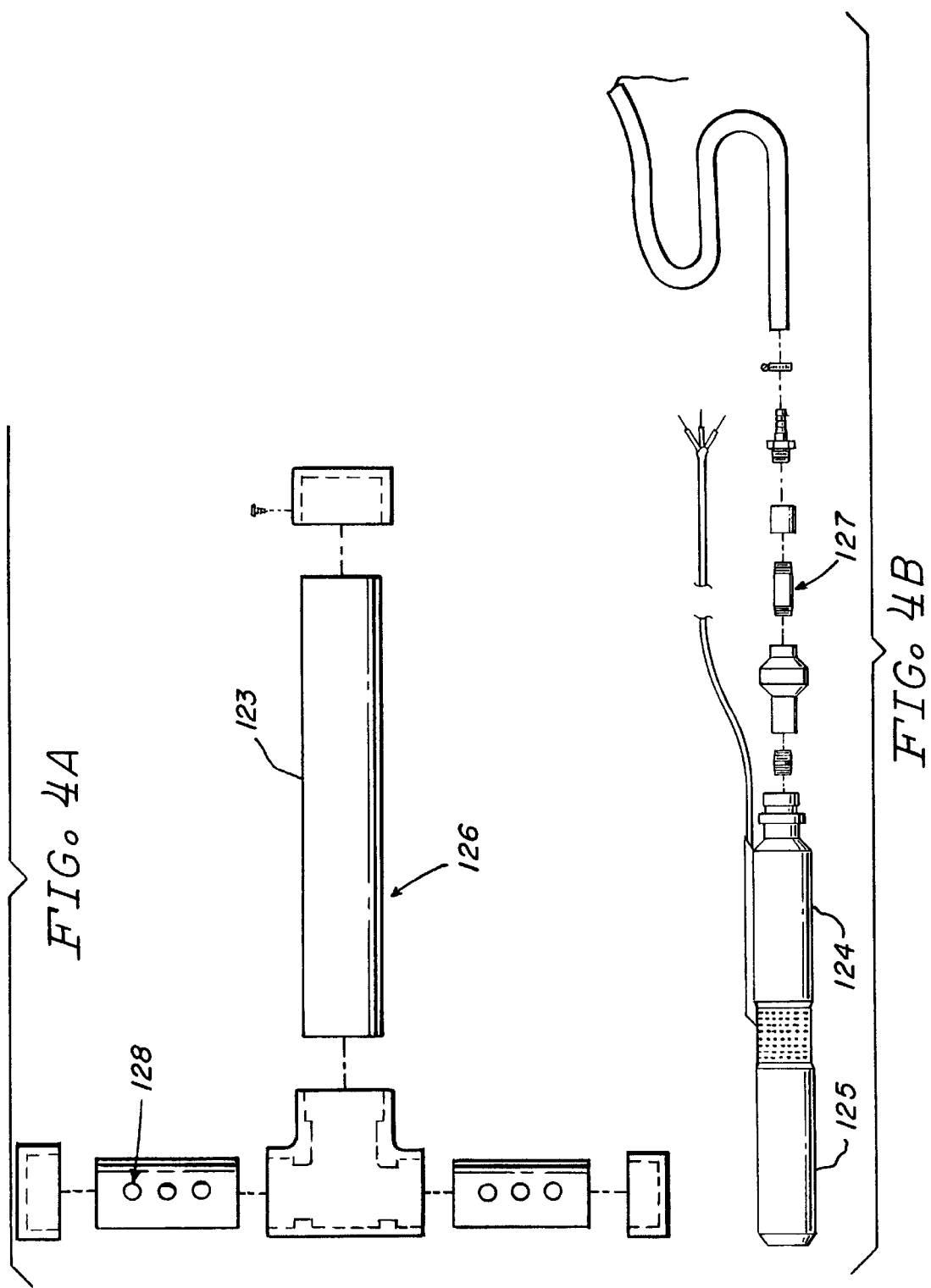

PORTABLE WATER TANK AND BOOSTER

This invention is based on United States provisional patent application Ser. No. 60/047,837, filed May 28, 1997, and entitled "Portable Water Tank."

BACKGROUND OF THE INVENTION

This invention relates to an apparatus for storing and delivering potable water; more particularly, the invention relates to a portable water tank having an internal pressurizing pump and pressure controls for delivering water to a remote destination on demand and under controlled water pressure conditions.

The need for portable water supply systems is apparent in a number of different situations. For example, certain residential emergencies frequently occur, where the residential water supply is rendered inoperative or unusable, as in cases of flooding or other natural disasters. Temporary failures in municipal water supply systems can occur, through water line ruptures, construction accidents, and municipal supply pollution disasters.

Other situations exist where the need for temporary water supplies exist. For example, remote housing such as cabins and lake cottages may be far removed from any regular supply of water. Likewise, special events at remote locations, such as outdoor concerts and events, may create a temporary need for a water supply during the event. Likewise, commercial and industrial ventures may require a temporary water supply during a temporary construction or operational phase of the business.

The present invention satisfies the need arising out of all of the foregoing examples, by providing a transportable, pressurized water supply capable of delivering up to thousands of gallons of water to a site for use under all conditions of weather and temperature. It is the principal object of the present invention to provide a device for delivering potable water at a site where normal water supplies either do not exist, are temporarily unusable, or are otherwise undesirable.

It is another object and advantage of the present invention to provide a water tank having an internal pressure pump and heating capability, with pressure regulation for the delivery of water stored in the tank.

SUMMARY OF THE INVENTION

The present invention includes a storage tank having an internal storage volume preferably in the range of 100 to 1000 gallons, and a submersible pump retained in the interior of the tank. An air-hydropneumatic pressure tank may also be contained within the storage tank and is connected to the pump outlet and to an external delivery port for removing water from the storage tank. An exterior control box contains pressure regulating apparatus and may optionally contain temperature control apparatus for connection to heating coils placed within the storage tank and within the control box.

BRIEF DESCRIPTION OF THE DRAWINGS

The invention is best understood with reference to the following specification and claims and with reference to the appended drawings in which:

FIG. 4A shows an alternative construction for a flow inducer; and

FIG. 4B shows an exploded view of a pump and motor drive unit associated with the flow inducer.

DESCRIPTION OF THE PREFERRED EMBODIMENT

Figure 1:
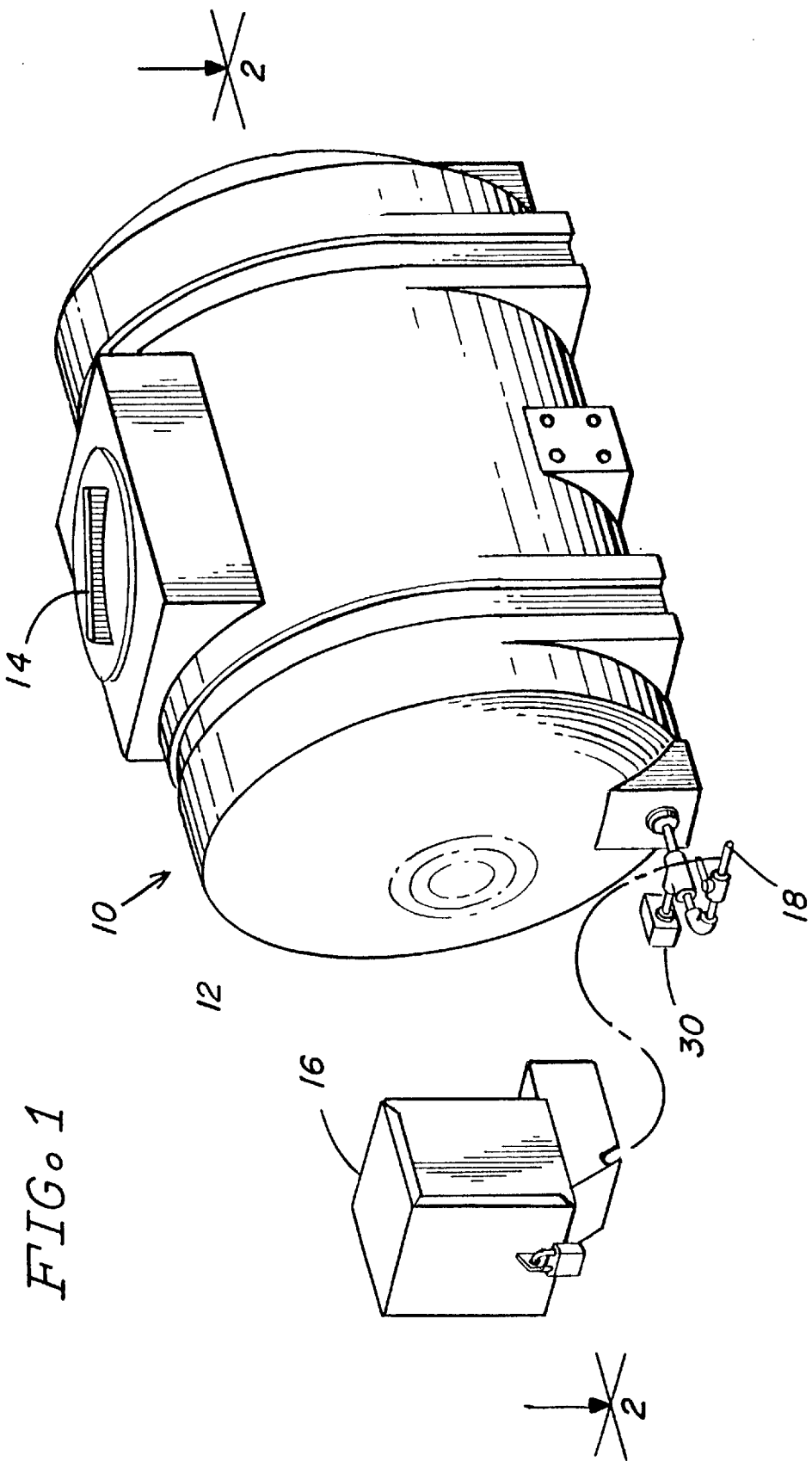
FIG. 1 shows an isometric view of the invention.

Referring first to FIG. 1, there is shown an isometric view of the invention. The portable water supply system 10 includes a storage tank 12 having a tamper-resistant cover 14. A control box may be affixed to the exterior of tank 12, to partially enclose a discharge pipe 18 with a pressure regulator 20. The storage tank 12 may preferably be constructed of metal or fiberglass materials.

Figure 2:
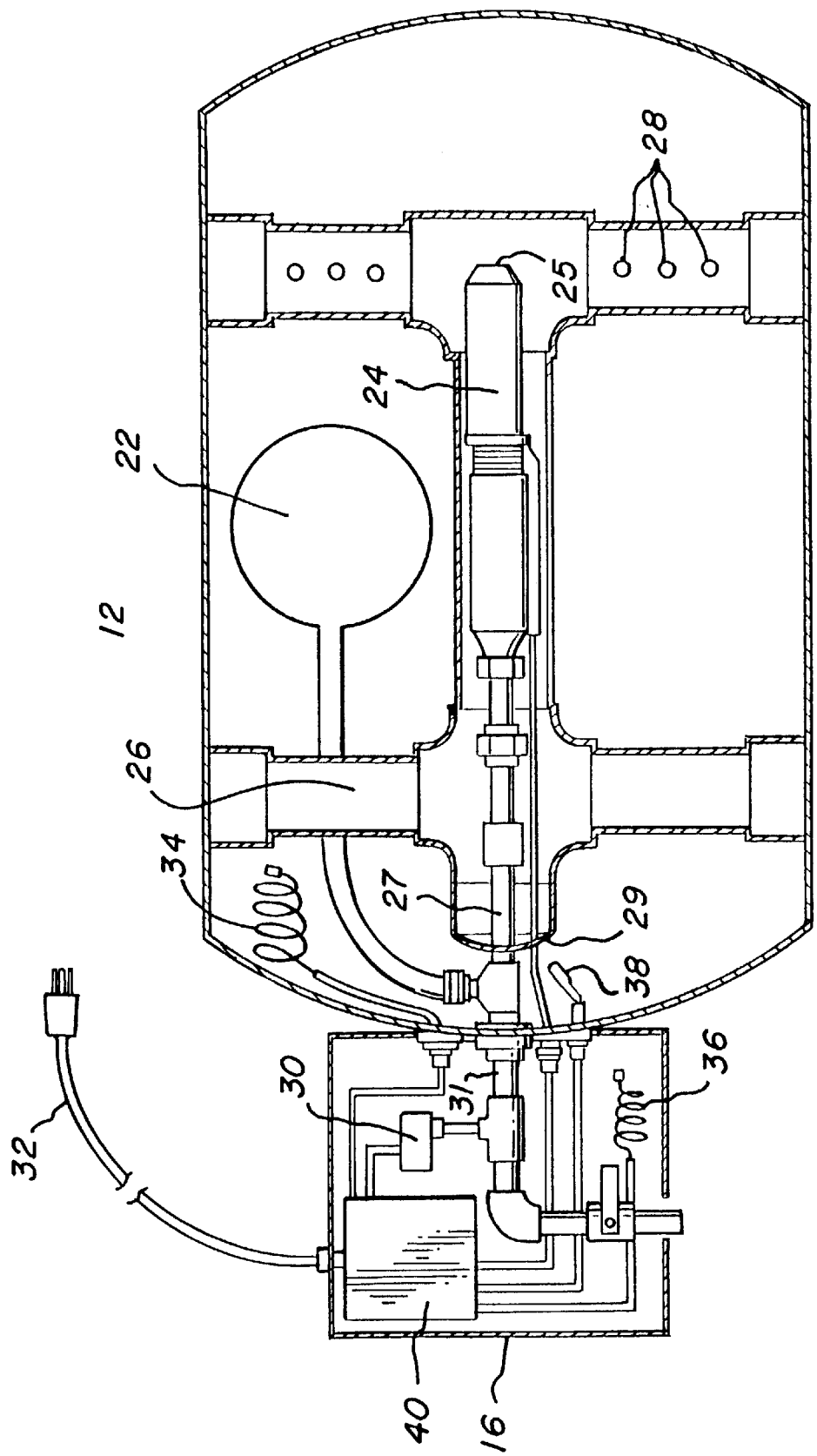
FIG. 2 shows a top view in partial cross section.

FIG. 2 shows a top view of the invention with the top section of storage tank 12 removed to illustrate the internal components. An H-shaped flow inducer 26 rests on the bottom of the storage tank 12; flow inducer 26 may have a plurality of openings 28 to permit the free flow of water from the tank interior into the interior of flow inducer 26, which serves as a reservoir for the turbine pump 24. A turbine pump 24 is placed inside of flow inducer 26, having an inlet 25 and an outlet 27. The outlet 27 is connected to a "T" connection 29, and "T" connection 29 is also connected to an air-hydropneumatic pressure tank 22 and to a discharge pipe 31. Discharge pipe 31 is connected to a control valve 33 which connects to an appropriate delivery line. A pressure switch 30 is tapped into the discharge pipe 31 so as to monitor the water pressure flowing through discharge pipe 31.

A control box heater 36 may be included inside control box 16 in cases where the system is used in below-freezing temperatures. Likewise, a heater 34 may be included inside storage tank 12, to prevent the water stored in tank 12 from freezing in low temperatures.

All of the control functions of the system are performed electrically in main control module 40, which contains circuits of conventional design for the desired functions. For example, a temperature sensor (not shown) may be incorporated into the control box 16 or the storage tank 12, or both, for monitoring the requisite temperatures. The main control module 40 may have circuits for activating either or both of the heaters 34 and 36 upon detecting a predetermined temperature via the temperature sensors. The pressure switch 30 may be electrically connected to conventional circuits in the main control module for monitoring water pressure, and for activating the turbine pump whenever the pressure drops below a predetermined value and for deactivating the turbine pump whenever the pressure exceeds a second predetermined value. A water level control switch 38 may be positioned inside storage tank 12, to detect when the water level drops below a certain value, to cause the turbine pump to become deactivated at that level. The electricity for operating all the main control module circuits, and the other electrical devices, may be obtained via power supply cord 32 connected to a conventional AC power source.

Optionally, the main control module 40 may contain circuits for shutting off the heaters 34 and 36 whenever the turbine pump 24 is operating, to conserve electrical energy in the operation of the system.

Figure 3:
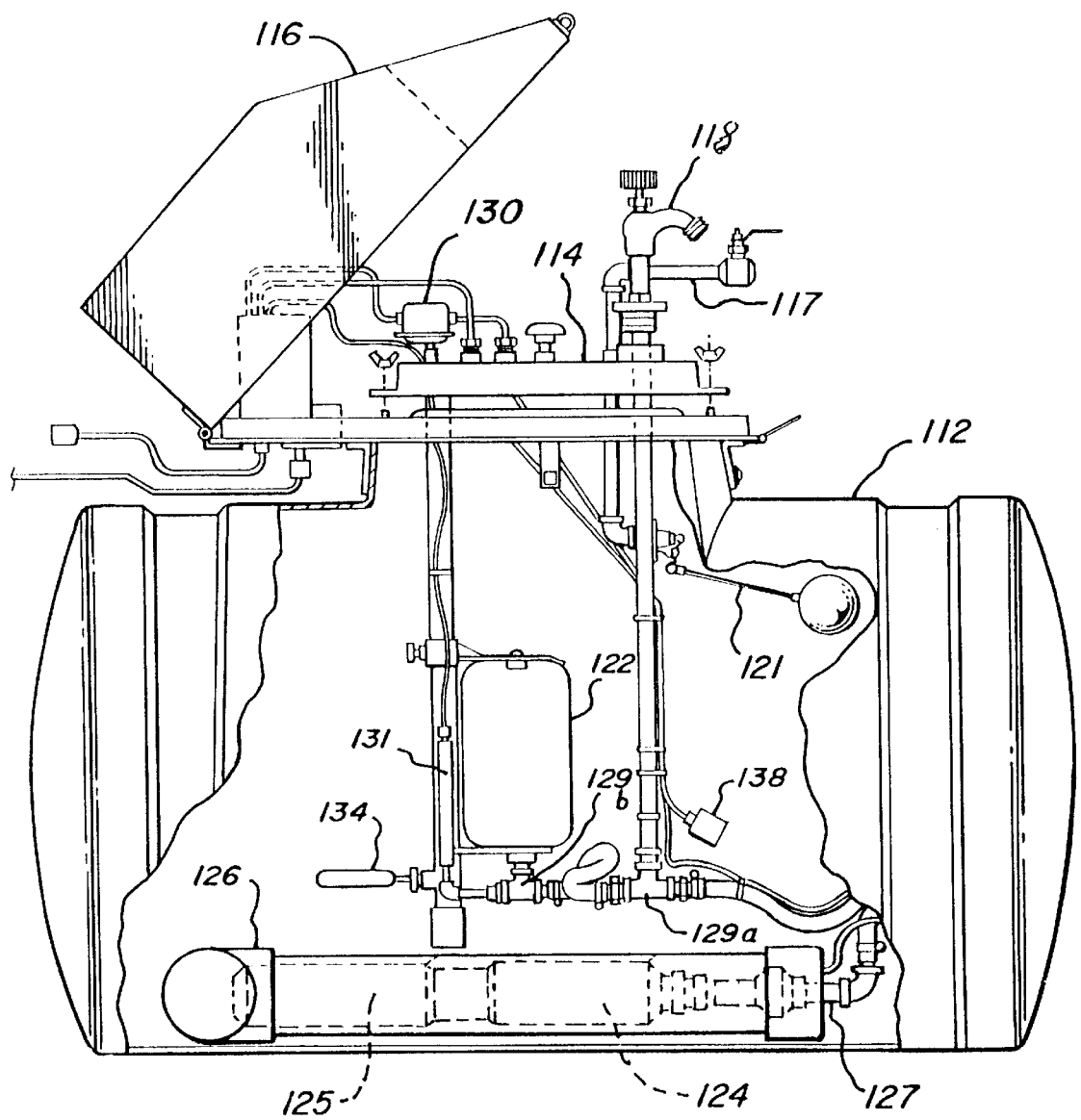
FIG. 3 shows an alternative embodiment of the invention.

FIG. 3 shows an alternative embodiment of the invention, illustrating a control panel 116 mounted at the top of tank 112. An access cover 114 is affixed against a top opening of tank 112, and all of the pipes and electrical connections access the interior of tank 112 via openings through access cover 114. This construction simplifies the overall system construction, and it simplifies maintenance and repair procedures, for it permits all of the internal components to be inserted and removed from the tank through the top opening.

The embodiment of FIG. 3 contemplates an inlet water pipe 117 as well as a discharge pipe 118, which enables the system to be used as a booster system together with an existing water supply. An internal mechanical float valve 121 may be used in conjunction with the inlet water supply pipe to shut of the inlet water whenever the water level inside tank 112 reaches a predetermined level.

A flow inducer 126 is set on the bottom of the tank 112 interior, and a turbine pump 124 and electrical drive motor 125 are mounted inside flow inducer 126. The pump outlet 127 is connected to a "T" connection 129a, and "T" connection 129a is connected to a second "T" connection 129b which is connected to an air tank 122. The "T" connection 129b is also connected to a pressure sensor 131, which monitors the pressure of the pumped water out of pump 124. Pressure sensor 131 is connected to a pressure switch 130 which controls the on/off time of the voltage to drive motor 125, and therefore controls the pump 124 operation. The "T" connector 129a is also connected to discharge pipe 118 to discharge water from the system.

A low water sensor 138 detects low water levels inside tank 112 and is operative to shut off the pumping system whenever the water becomes too low. A heater may be activated at low water temperatures to prevent the water inside tank 112 from freezing.

FIG. 4A shows a top exploded view of a flow inducer 126 used in the embodiment of FIG. 3 illustrating the construction of the flow inducer and the openings 128 for water flow into the flow inducer. FIG. 4B shows an exploded view of the pump 124 and motor 125, as well as the outlet fittings which form outlet 127. These components are inserted into the elongate pipe 123 which forms a part of flow inducer 126, before the flow inducer is inserted into the tank 112. The position of the motor 125, upstream from the pump 124, permits water drawn into the openings 128 of the flow inducer to pass over the motor and thereby to act as a cooling influence on the motor.

In operation, the system is transported to the desired destination and is connected to a water delivery line; the electrical power is connected via line 32. The turbine pump activates and pumps water into the air-hydropneumatic tank until the pressure in the system builds up to a level detected by the pressure switch, which causes the turbine pump to shut off. As water is taken through the discharge pipe the pressure level is maintained by the pressure switch periodically re-activating the turbine pump to maintain water pressure between two preselected pressure levels. When the water stored in the storage tank drops to a level detected by the low water switch, the pump and other system components are shut off until the tank is refilled to an operative level.

If the system is used as a booster system, a water inlet connection is made to the inlet pipe; and the system is activated to receive water, elevate the water pressure to a predetermined level, and then to deliver water to the remote site.

Although the invention has been described with reference to the preferred embodiment thereof, it is apparent that persons skilled in the art may make modifications and changes within the essential spirit and scope of the invention.

What is claimed is:

1. A portable water system, comprising:

a. a storage tank having an access cover and a water discharge pipe;

b. a submersible pump located inside the storage tank proximate the bottom of the tank, the pump being connected to the water discharge pipe;

c. an air-hydropneumatic tank inside the storage tank and having a connection to the water discharge pipe;

d. a pressure switch connected to monitor the water pressure inside the water discharge pipe, and having means for activating and deactivating at predetermined pressure levels; and e. electric circuit means connected to the pressure switch and to the submersible pump, for turning the submersible pump on and off in response to pressure switch activations and deactivations.

2. The apparatus of claim 1, further comprising a flow inducer seated on the bottom interior of the water storage tank, having a plurality of openings to permit the flow of water therein, and wherein the submersible pump is contained inside the flow inducer.

3. The apparatus of claim 2, further comprising an electrical heater in the water storage tank, and a temperature sensor in the water storage tank, and means for activating the electrical heater in response to signals from the temperature sensor.

4. The apparatus of claim 3, further comprising a control box affixed to the exterior of the water storage tank, the control box enclosing the pressure switch and the electric circuit means.

5. The apparatus of claim 4, further comprising an electrical heater in the control box and a temperature sensor in the control box, and means for controlling the activation of the electrical heater in response to signals from the temperature sensor.

6. A portable water delivery system, comprising:

a. a water storage tank having an access cover and a water discharge outlet pipe;

b. a flow inducer in the bottom interior of said water storage tank, said flow inducer having a plurality of inlet openings and an interior chamber;

c. a submersible pump located inside the interior chamber of said flow inducer, said pump having a pump outlet connected to said water discharge outlet pipe;

d. an air tank inside said water storage tank, having a connection to said water discharge outlet pipe and to said pump outlet;

e. a pressure switch connected to respond to the water pressure in said water discharge outlet pipe, and having means for generating electrical signals at predetermined high and low pressures;

f. electrical circuit means connected to said pressure switch and to said submersible pump, for activating and deactivating said pump in response to signals from said pressure switch; and g. water level detection means in said water storage tank, and means for signaling said electrical circuit means to shut off said pump at predetermined low levels of water detected in said water storage tank.

7. The apparatus of claim 6, further comprising electrical heating means in said water storage tank, and means for detecting water temperature and turning said heating means on and off in response to detected water temperatures.

8. The apparatus of claim 7, where said water storage tank further comprises a tank made from plastic materials.

9. A water delivery system, comprising:

a. a storage tank having a top opening and an access cover attachable over the opening;

b. a water pump assembly comprising a flow inducer, a pump, and a pump drive motor, said assembly sized for insertion into said tank and removal from said tank through said top opening;

c. an air tank insertable into said tank and connected to said pump, and a discharge pipe connected to both said air tank and said pump, said discharge pipe passing through said access cover; and d. means for monitoring the pressure of water delivered from said pump, and further means for controlling the operation of said pump in response to the monitored pressure.

* * * * *